Patented June 22, 1943

2,322,445

UNITED STATES PATENT OFFICE 2,322,445

PRINTING PROCESS

Walter Huber, Mount Kisco, N. Y., assignor to J. M. Huber, Inc., New York, N. Y., a corporation of New Jersey No Drawing. Application April 24, 1941,
Serial No. 390,109

6 Claims. (Cl. 101—426)

The present invention relates to a new method of commercial printing by which to obtain new printing effects and other advantageous results. The method of this invention has many applications, but is particularly effective for large volume high speed printing, by gravure, letter-press or off-set, of containers, publications and literature of all sorts.

This application is a continuation-in-part of my co-pending application, Serial No. 161,579, filed August 30, 1937.

It is an object of my invention to provide new and efficient printing methods or processes which make use of a new type of printing ink and which rapidly produce printed matter in the form of thin, non-tacky films securely adhering to the surface of suitable stock. Another object of my invention is to provide a method of obtaining new printing effects, and to secure other advantages which will be mentioned in or apparent from the following description.

It is well known in the art that commercial printing inks are printed at normal temperatures, after which they are dried in one or more of the following ways: By oxidation and/or by polymerization of the oily constituents of the vehicle, by evaporation of the solvent or carrier, by penetration and absorption within the interstices of the paper. These drying processes are sometimes accelerated by the application of heat after printing.

Gravure inks and the new quick-drying letter-press inks, at present in use, rely on evaporation of the solvent or carrier. This evaporation is usually hastened by the application of heat after printing. Gravure inks consist of pigment, resinous binder, and volatile solvents, such as xylol, toluol, and benzol, and diluents, such as naphthas. They are highly inflammable and have a tendency to settle out on standing. They must be thinned with additional solvent to adjust drying speed and consistency for printing, resulting in extra work and non-uniformity. The use of cheap diluents frequently causes mottling of solids and loss of detail in fine prints. The expelled solvents are detrimental to health and present a dangerous fire hazard. Since only approximately 50% of the ink deposited on the paper remains there after the volatiles have been expelled, these inks are necessarily low in pigment and binder concentration. The non-lubricating qualities of the solvents cause excessive wear of printing surfaces and doctor blades.

The quick-drying letter-press inks also consist of pigment, binder, and solvent, but the solvents in these inks possess high boiling points. These inks, therefore, require the application of considerable heat after printing to evaporate the solvents sufficiently rapidly to produce a dry print.

News inks consist of pigment dispersed in non-drying mineral oils, sometimes bodied with resins or vegetable oils. They penetrate into the interstices of porous news stock by capillary attraction, thereby fixing the pigment onto the fibres. Because these inks never actually become solid, they have a tendency to smear. The side of the paper first printed is, therefore, always marred by the printing of the reverse side, and "first impression" printing is recognized as inferior to "second impression" printing, and is a constant source of trouble to printers. Both sides are subject to marring in passing over angle bars and folders, and are apt to soil hands and clothes of readers. For high speed presses these inks must be thin in consistency and, therefore, sometimes have a tendency to settle. The process of this invention further has the object of producing printed matter with ink that resists transfer or off-set under ordinary or moderate heat and pressure, and consequently "first impression" is not marred by the printing of the reverse side as above indicated.

Present commercial inks for all uses except those described above are often first fixed by penetration but ultimately dry by oxidation and/or polymerization of the vehicle. These inks consist of pigment dispersed in polymerized drying oils, such as linseed or China-wood oil, with addition of metallic soaps to facilitate drying. The drying speed of these inks must be delicately adjusted so that they will not dry on the press, but as soon thereafter as possible. In multicolor printing, where one ink is superimposed on the other, the first ink must still possess tack when the second color is applied, as an ink will not trap on a "bone dry" print. Since climatic changes in the pressroom affect the speed of oxidation, adjustments in the ink must frequently be made in the pressroom to obtain the required drying speed. Prints made with these inks must be handled with extreme care to prevent spoilage until the oxidation is complete. Because of their chemical activity, these inks stiffen with age, react with pigments causing hardening or livering, and form skin in containers and press fountains. Presses must, therefore, be cleaned when not in use.

The consistency of all such inks must be adjusted by formula to meet the requirements of the type and speed of press, the medium to be printed on, and their ultimate use.

The methods of the present invention utilize inks which do not dry by oxidation or polymerization, evaporation, or absorption, and they eliminate many of the disadvantages of processes utilizing the previously described inks. Instead of employing an ink which is fluid at ordinary room temperature and which is dried by any one of the methods above enumerated, the present invention uses an ink which is naturally solid or hard at ordinary temperatures. Such an ink is applied at a somewhat elevated temperature, at which the ink is melted and has a workable consistency suitable for making the impression. When the stock has been printed and the molten ink leaves the printing surfaces, the ink immediately cools to a temperature at which it solidifies and hardens.

Briefly described, therefore, the invention herein claimed comprises a process of printing, by means of a suitably heated letter-press, litho, and/or gravure printing machine, which avails itself of the characteristics of normally solid printing inks consisting of pigments and/or dyes dispersed in substantially solvent-free solids that will melt to printing consistency at elevated temperatures. Such an ink is heated to an elevated temperature at which it is molten and possesses a suitable printing consistency, and it is then printed from a suitably heated printing form onto paper or other relatively cold stock in films so thin that the print sets, by freezing, almost instantaneously upon leaving the printing surfaces. It has been found that when such thin film of molten ink are printed onto ordinary paper stock, supplied at normal temperatures or at other temperatures well below the melting point of the ink, the stock possesses a sufficient heat absorbing capacity to set the print before any substantial penetration thereof into the fibres of the paper. In this way new printing effects may be obtained which are distinctly superior to those obtained with the known printing processes referred to hereinabove. The printed product is especially superior when printing on fibrous, porous or uncoated paper stocks, such as newsprint or the like, by reason of the clarity and sharpness of outline of the printed ink films and their characteristic of lying almost wholly on the surface of the paper without substantial penetration into the fibres or interstices thereof.

Broadly speaking, the inks to be employed in the practice of my invention may comprise, in addition to pigments or other coloring material, fusible solids of somewhat high solidification point together with other materials which will tend toward proper viscosity and printing qualities in the fused ink and a suitable degree of hardness or solidity in the ink at ordinary temperatures. The compositions of the inks used in the practice of this invention may vary from very simple formula to those which are more complex. The following example illustrates the composition of a very simple ink of the kind described:

Example 1

| | Parts |
|---|---|
| Carbon black | 10 |
| Gilsonite | 45 |
| Candelilla wax | 45 |

The wax is first melted and the carbon black may be thoroughly incorporated into the wax by use of suitable mixing and milling equipment, after which the gilsonite may be added in a steam jacketed mixer.

A more complex composition is illustrated by the following example:

Example 2

| | Parts |
|---|---|
| Gilsonite | 50 |
| Candelilla wax | 40 |
| Chrome orange | 6 |
| #3 litho varnish | 3 |
| Carbon black | 1 |

Blends of candelilla wax and gilsonite have the property of wetting and adhering to the fiber of the stock, of changing viscosity gradually above their melting point, passing through stages where the length and tack of the blend produce a suitable printing consistency, and of having so little surface tension that apparently they tend to flow out in a flat pool rather than cohering in a droplet, as does water on a waxy surface. These properties play an important part in providing the desired qualities of inks prepared according to the present invention. When solidified at normal temperatures, the surface of a print made from an ink consisting predominantly of these materials is dry and hard.

I have found that certain waxes, resins, pitches and equivalent substances have these properties in degree sufficiently pronounced to adapt them for use in accordance with the principles of the invention. Inks such as claimed in my aforesaid co-pending application generally are suitable, which consist of coloring pigments incorporated in solid thermo-fluid vehicles which contain not less than about 40%, by weight, of hard thermoplastic resin together with a minor proportion of hard wax or wax-like material. While neither resin nor wax, alone, possesses the requisite physical properties and consistency when molten for use as the ink vehicle, inks which utilize a combination of their properties have been found satisfactory.

The following is an example of such an ink having a synthetic resin incorporated therein:

Example 3

| | Parts |
|---|---|
| Synthetic petroleum resin (Santo Resin) | 60 |
| Ozokerite | 20 |
| Peacock blue | 20 |

(Santo Resin is an isobutylene polymer which melts completely at a temperature of about 104° C. It is available from the Monsanto Chemical Company.)

The ink of Example 1 softens at about 64° C. The viscosity change at this temperature is very gradual. At 75° C. it has an ideal printing consistency.

The ink of the third example reacts similarly to the ink in Example 1, but the body of Example 3 is light colored, which permits the use of colors without affecting their brilliancy to any extent.

An example of an ink particularly suitable for the printing of magazines and the like by rotary letter-press is as follows:

Example 4

| | Parts |
|---|---|
| Cumar V resin | 30 |
| Gilsonite resin | 20 |
| China-wood oil (heavy bodied) | 20 |
| Carnauba wax | 20 |
| Carbon black | 9 |
| Toners | 2 |

Still another example, which is suitable for high speed newspaper printing on heated letterpress machines, printing porous newsprint on both sides according to my invention, is as follows:

Example 5

| | Parts |
|---|---|
| Cumar V resin | 28 |
| Gilsonite resin | 21 |
| Hydrogenated soya bean oil (a wax substitute) | 40.5 |
| Carnauba wax | 10.5 |
| Carbon black | 11.6 |

The ink of Example 4 begins to melt at about 78° C. and is liquid at about 85° C. It has a suitable printing consistency at about 100° C.

The ink of Example 5 melts at temperatures of about 72–74° C. and possesses a very low viscosity and other qualities suitable for high speed newspaper printing at temperatures above 100° C.

The processes of this invention are capable of being carried out by the use of various types of printing members, including plates made by the etching processes that are used by the commercial printers. In gravure printing pursuant hereto, the etched plates do not require deeply etched cells; in fact, it may be desirable in gravure printing to use etchings shallower than customary. In carrying out the present processes, therefore, prints are produced which have printed ink films thereon of normal thickness. In letterpress work the thicknesses are less than .001 of an inch, while in gravure, .002 to .003 inch is the upper limit.

The inks used according to the present invention in general have melting points below the temperatures at which the stock printed upon will be injured, or at which the copper, zinc, lead or alloy printing plates soften, or at which rubber or composition inking rollers of the printing press will be deleteriously affected. Other properties and conditions which should be considered in selecting the particular ingredients with which the inks may be compounded are as follows:

The ink on the printed sheet should not be liquid below 50° C. in order that it will remain fixed in a warm climate and when exposed to the sun on newsstands. The fusible solid used in such inks must not be of a type that will penetrate deeply in the fused state through the fibers of paper stock, but rather must be of a type that will adhere readily to the surface thereof with a minimum of penetration into the fibers.

Most of the inks used in the practice of my invention have had melting points lying between 50° and 90° C., but I do not wish to limit my invention to these temperatures, as it is conceivable that inks of higher or lower melting points will react in accordance with the principles of my invention and may prove advantageous for certain properties and uses. Finished prints made with inks such as above described, when subjected for periods as long as 18 hours to temperatures up to 82° C., remained unaffected. It is, therefore, not necessary to have the melting point higher than the highest temperature to which the finished print may be exposed in order to prevent deterioration of the print. Thus it is possible to make my type of ink with a melting point low enough to permit using it in the fused state without injury to delicate pigments, and still get the necessary solidifying properties on paper.

In my experience I have also found it advantageous to use pigments ground or flushed in linseed oil as a means of introducing thoroughly dispersed pigments into a suitable solid of elevated melting point. These inks were satisfactory from the standpoint that they solidified sufficiently on cooling to permit handling and prevent off-setting.

It will be understood that numerous advantages, including the following, can be obtained in the practice of the invention herein disclosed. The ink may be made non-inflammable, non-toxic, and odorless; it will print solids smoothly; it can be made with a high pigment concentration so that when applied in an exceedingly thin film it will produce sharper detail and give greater coverage, color intensity, and brilliance; it has excellent lubricating qualities. It can be made to resist the chemical action of acid, alkalies, alcohol, etc., on the pigment due to the protection afforded by the solid dispersing medium. It does not spread and, therefore, prints sharply, has practically no strike-through and, due to its instantaneous drying, eliminates many troubles due to off-set or smudging and eliminates the necessity of resorting to off-set webs and slip-sheeting with all of their disadvantages. The print can be used or backed up immediately as it is completely dry immediately after being printed. It does not liver, skin, settle, or change with age, nor is it affected by climatic changes in the pressroom. Since no chemical change takes place in my ink from the liquid to the dry stage, ink that has solidified on the press is not lost but can be reclaimed readily.

My ink can be produced at moderate cost, can be packed and shipped economically and handled easily, will not leak out of containers, and is unaffected by transit, age or climate.

For the purpose of applying this ink, the press is equipped with suitable heating means to maintain the ink in a proper liquid condition during the printing operation. It may be desirable under some conditions to equip the press with suitable heating devices in order to heat the paper after being printed for a sufficient length of time to cause the ink further to flow or to spread to a smoother surface before solidifying. It may also be desirable to equip the press with a suitable heating device to heat the paper before printing in order to facilitate this flow. In high speed printing or in perfection or multi-color printing according to my invention, however, it is usually desirable to chill the print after each impression, as by means of a water-cooled roller or the like thereby increasing the hardness and mar-resistance of the print. Such modifications of standard equipment will be readily visualized by persons skilled in the art, having in mind the characteristics of the particular ink desired to be used. It will be understood, however, that the paper or other stock, when ready to be printed, should always be cool enough to have a heat absorbing capacity sufficient to cause substantially instantaneous setting of the thin molten ink films printed thereon.

It will be noted that an important feature of the process of the invention lies in the fact that the temperature of the printing operation may be controlled to obtain the printing characteristics desired in the ink. The consistency and other printing qualities of the ink rest solely in temperature control, which renders one ink suitable for a wide range of purposes. By merely varying the temperature, the gloss and sharpness of the print can also be controlled without varying the formula.

I claim:

1. Process of printing by gravure or off-set consisting in providing an ink that is solid at printing room temperatures, heating said ink until it fuses to a workable consistency for printing, feeding said fused ink to suitable printing surfaces, and impressing thin films of the fused ink from said surfaces onto stock having sufficient heat absorbing capacity substantially instantaneously to freeze and set said thin films in adherence to the surface of the stock, so that the print thereby formed dries by solidification instantaneously on leaving the printing surfaces.

2. Process of perfection printing which comprises effecting each of the successive impressions by providing an ink which is solid and unworkable at temperatures below 50° C., heating said ink to such temperature above 50° C. as to melt it to a workable consistency for printing, feeding said fused ink to a suitable gravure or off-set printing form and impressing thin films of the fused ink from said form onto stock having sufficient heat absorbing capacity substantially instantaneously to freeze and set said thin films in adherence to the surface of the stock, so that the print thereby formed dries by solidification instantaneously on leaving the printing surfaces.

3. The process of producing printed publications, containers and other literature which comprises printing at an elevated temperature onto relatively cold stock, by means of a suitably heated gravure or off-set printing machine, thin molten films of a normally solid printing ink comprising coloring pigment incorporated in a thermo-fluid vehicle that is solid at ordinary temperatures and non-volatile at both ordinary and elevated temperatures, and substantially instantaneously setting the ink films so printed, by freezing thereof when printed, in adherence to and substantially entirely on the surface of the stock, the heat absorbing capacity of said stock and the mass and temperature of said thin ink films being in such relationship that said setting occurs by absorption of heat from the ink films into the stock.

4. The process of producing printed publications, containers and other printed matter which comprises providing and melting a normally solid thermo-fluid printing ink, applying the same in thin molten films to the printing elements of a suitably heated gravure or off-set printing form, supplying to said form relatively cold stock having sufficient heat absorbing capacity substantially instantaneously to set said thin molten films when the same are printed thereon, and printing said thin molten films from said form onto such stock thereby substantially instantaneously freezing and setting the print in adherence to and substantially entirely on the surface of the stock.

5. Process of producing printed publications and other printed matter by gravure printing which comprises providing a normally solid thermo-fluid ink, heating said ink until it melts to a consistency suitable for such printing, applying said molten ink to a heated gravure printing form, supplying to said form relatively cold stock having sufficient heat absorbing capacity substantially instantaneously to set thin films of said ink when printed thereon, and printing said ink from said form onto said stock in films so thin that the print thereby formed sets by freezing substantially instantaneously upon leaving the printing form.

6. Process of producing printed publications and other printed matter by gravure printing which comprises providing a normally solid thermo-fluid printing ink, heating said ink until it melts and attains a fluid consistency suitable for such printing, applying said molten ink to a suitable heated gravure printing form, and printing said molten ink from the recesses of said form, in films less than .002 to .003 inch thick, onto paper stock at a normal temperature.

WALTER HUBER.